United States Patent [19]

Ishii

[11] Patent Number: 4,858,058
[45] Date of Patent: Aug. 15, 1989

[54] CIRCUIT BREAKER INCLUDING SELECTIVELY OPERABLE LONG-TIME-DELAY TRIPPING CIRCUIT

[75] Inventor: Kazuhiro Ishii, Hiroshima, Japan
[73] Assignee: Mitsubishi Denki Kabushiki Kaisha, Tokyo, Japan
[21] Appl. No.: 227,126
[22] Filed: Aug. 2, 1988

[30] Foreign Application Priority Data

Aug. 4, 1987 [JP] Japan .................................. 62-195693

[51] Int. Cl.⁴ ............................................. H02H 3/093
[52] U.S. Cl. ........................................ 361/96; 361/97; 340/662
[58] Field of Search ........................... 361/18, 44–50, 361/86, 91, 93–98, 99, 100, 102; 340/641, 642, 650, 651, 662, 664; 364/481, 483

[56] References Cited

U.S. PATENT DOCUMENTS

| | | | |
|---|---|---|---|
| 4,224,651 | 9/1980 | Allen et al. | 361/97 X |
| 4,347,541 | 8/1982 | Chen et al. | 361/97 X |
| 4,763,220 | 8/1988 | Belbel et al. | 361/93 X |

FOREIGN PATENT DOCUMENTS 55-29931 7/1980 Japan .
60-32211 2/1985 Japan .

Primary Examiner—Todd E. DeBoer
Attorney, Agent, or Firm—Burns, Doane, Swecker & Mathis

[57] ABSTRACT

In a circuit breaker, a timer circuit is employed for delay interrupting operation in case of line failure. The timer circuit includes at least a peak value converting circuit, an effective value converting circuit, a switch, and a switching control circuit. When the failure current is lower than a predetermined threshold level, a long-time delay tripping circuit of the timer circuit is operated in response to an effective value voltage from the effective value converting circuit. When the fail current exceeds over the threshold level, the long-time delay tripping circuit is operated in response to a peak value voltage from the peak value converting circuit so as to avoid an adverse influence of the saturation characteristic of the current transformer.

8 Claims, 9 Drawing Sheets 4,858,058

CIRCUIT BREAKER INCLUDING SELECTIVELY OPERABLE LONG-TIME-DELAY TRIPPING CIRCUIT

BACKGROUND OF THE INVENTION

1. Field of the Invention

The present invention generally relates to a circuit breaker having an overcurrent tripping apparatus. More specifically, this invention is directed to a circuit breaker in which a long-time-delay tripping circuit is selectively operable with a peak value converting circuit and an effective value converting circuit.

2. Description of the Related Art

In a power distributing system, when an accident such as a shortcircuit occurs and a fail current flows through the power distributing system, there is used a system in which a predetermined circuit breaker is made operative to thereby suppress an adverse influence on a power source by the fail current as little as possible. Also, the failed power line can be protected.

For example, as disclosed in Japanese KOKAI (Disclosure) No. 60-32211 (1985) and Japanese U.M. Publication No. 55-29931 (1980), according to such a kind of circuit breaker, when a load make and break (switching) contact is closed and an electric power is supplied from a power source terminal to a corresponding load side terminal through the load make and break contact, and a fail current flows through an AC line, a current transformer detects this fail current at a specific current transforming ratio which is inherent to this current transformer and induces an output current on the secondary winding.

An output signal from a signal converting circuit is supplied to a fail processing circuit. When it is determined that the level of the fail current is at a predetermined level or higher, this level detection signal is input to a timer circuit. The timer circuit executes a predetermined timer operation on the basis of this signal and triggers a gate of a thyristor. Then, the timer circuit energizes a release type overcurrent tripping coil, opens the load make and break contact, and disconnects a fail line from the power distribution system.

As shown in FIG. 1, the timer circuit includes an instantaneous tripping circuit, a short time delay tripping circuit, and a long-time-delay tripping circuit which execute predetermined timer operations when the fail current reaches values in an instantaneous tripping current region, a short time delay tripping current region, and a long time delay tripping current region, respectively (refer to FIG. 6).

FIG. 2 shows an example of a conventional long-time-delay tripping circuit. A detection voltage corresponding to the fail current is converted into its effective value by an effective value converting circuit, which will be explained hereinlater. Thereafter, its output voltage eX is input to a first comparator 35 of a long time delay tripping circuit 170. When the output voltage eX reaches a value which is, for instance, equal to (one time as high as) a reference voltage eY of a reference voltage "eY" setting circuit 37, an output switch 36 in the closed state of the first comparator 35 is opened, thereby enabling a capacitor 38 to be charged. This is because the output voltage eX of the fail current is applied to a voltage/current converter 44 and a predetermined output current $I_b$ is output to the capacitor 38.

Now, assuming that a rated current is set to, e.g., 200 A, the reference voltage eY of the reference voltage "eY" setting circuit 37 is set to, e.g., 0.6 V. When the output voltage eX from the effective value converting circuit reaches 0.6 V, the output switch 36 in the closed state of the first comparator 35 is opened and the charging to the capacitor 38 is started. In this case, a fail current flowing through the AC line at the start of the charging is 240 A.

Between the input voltage eX and the output current $I_b$ of the voltage/current converting circuit 44, there is a predetermined relation such that the output current $I_b$ increases as the input voltage eX increases.

That is, when the input voltage eX is set to, e.g., 0.5 V, the output current $I_b$ is converted into 1 $\mu$A, and when the input voltage eX is set to 1 V, the output current $I_b$ is converted into 4 $\mu$A.

Therefore, the output voltage eX (1 V) is converted into the current $I_b$ (4 $\mu$A) by the voltage/current converting circuit 44. The capacitor 38 is charged by the output current $I_b$.

When a charging voltage $e_1$ of the capacitor 38 rises and exceeds an output voltage $e_2$ of a reference voltage "$e_2$" setting circuit 42 of a long time delay operating time, an output signal of a long time delay operating time is output from a second comparator 41, thereby performing the interrupting operation for, e.g., 100 seconds (see FIG. 1).

FIG. 3 shows an example of a typical power distributing system to which the foregoing circuit breaker is connected. In the diagram, PF denotes a power fuse as a protecting device on the high voltage side, and TR indicates a transformer. A circuit breaker $B_1$ is connected to the secondary winding of the transformer TR. Other circuit breakers $B_2$ and $B_3$ are connected to its branch circuit, respectively.

In the power distributing system, if an accident such as a short-circuit occurred in, e.g., a branch circuit of the circuit breaker $B_2$, only the circuit breaker $B_2$ operates. None of the upper circuit breaker $B_1$ of the circuit breaker $B_2$ and the circuit breaker $B_3$ of the other branch circuit is made operative. Due to this, the spread of the accident in the power distributing system can be minimized as little as possible, thereby achieving the continuity of the power supply. In this manner, what is called "a selective circuit breaking system" is used.

To accomplish such a selective circuit breaking, as shown in FIG. 4, at least the circuit breakers $B_1$ to $B_3$ need to be made adjustable so as not to overlap the operating characteristic curves $b_1$, $b_2$, and $b_3$ of the circuit breakers $B_1$ to $B_3$.

On the other hand, in an overload region, the circuit breaker $B_1$, $B_2$, or $B_3$ must obviously operate before fusing the power fuse PF and at the same time, the deterioration of the fuse characteristic of the power fuse PF due to the repetition of the short-circuit accident must be also prevented.

In general, when the operating characteristic curve $b_1$ of the upper circuit breaker $B_1$ overlaps a characteristic curve F of the power fuse PF (in the hatched portion in FIG. 4), it is known that the operating characteristic curve $b_1$ of the circuit breaker $B_1$ needs to be adjusted to the low current side as shown by a characteristic curve $b_{12}$.

When describing the long time delay tripping operating characteristic curve, the adjustment of the operating characteristic curve $b_1$, $b_2$, or $b_3$ of the circuit breaker $B_1$, $B_2$, or $B_3$ can be accomplished by adjusting the current transforming ratio of the foregoing current transformer and the reference voltage eY of the reference voltage "eY" setting circuit 37 in the long time delay tripping circuit 170 in FIG. 2 to a value which is 0.5 to 1 time as large as the maximum set value of eY of the circuit breaker $B_1$, $B_2$, or $B_3$. That is, the long time delay tripping characteristic can be adjusted within a range which is 0.5 to 1 time as large as the maximum rated current of the circuit breaker $B_1$, $B_2$, or $B_3$.

On the other hand, the short time delay tripping characteristic curve of each of the circuit breakers $B_1$ to $B_3$ can be also adjusted by means similar to that in the case of the long time delay tripping operating characteristic curve.

However, there is the following problem in the case where only the fail current obtained from the effective value converting circuit is used as an input signal of the long time delay tripping circuit. That is, in a case that the fusing characteristic of the power fuse overlaps the operating characteristic of the relevant circuit breaker due to the saturation characteristic of the current transformer itself, as shown in FIG. 4, it is difficult to adjust this operating characteristic.

In the foregoing conventional system, when the fail current flowing through the AC line lies within a predetermined range where it is 5 to 10 times as large as the rated current, the effective value of the current induced on the secondary winding of the current transformer is saturated as shown in a characteristic curve (J) in FIG. 5, so that a primary current $I_a$ as the fail current and a secondary current $I_c$ (effective value) are not proportional with each other.

Thus, when the fail current falls within the range where it is 5 to 10 times as high as the rated current, the input voltage eX of the comparator 35 of the long time delay tripping circuit 170 is not proportional to the primary current $I_a$, and therefore, the current which is charged into the capacitor 38 from the voltage/current converting circuit 44 is smaller than the ideal value, so that the charging voltage $e_1$ of the capacitor 38 does not increase in accordance with a predetermined charging characteristic.

Namely, if the secondary current of the current transformer is influenced by the saturation, the timer operating time of the long time delay tripping circuit 170 is longer than the normal timer operating time, so that the accurate timer operation cannot be finally achieved.

Therefore, when the fail current flowing through the AC line is within a range where it is, for example, 1.2 to 5 times as large as the rated current, assuming that the operating current square time product is set to, e.g., 400 A×400 A×100 seconds, there is a drawback such that the circuit breaking operation can start only when the operating current square time product is 400 A×400 A×100 seconds or more, under the condition that the fail current falls within a range where it is 5 to 10 times as large as the rated current.

The present invention has been made to improve the conventional drawbacks and it is an object of the invention to provide a circuit breaker in which even when a fail current flowing through an AC line is sufficiently higher than a rated current, an accurate long time delay operating time can be assured.

It is another object of the invention to provide a circuit breaker in which even in the case of using a current transformer of such a relatively small capacity that tends to saturation, a breaking characteristic of the circuit breaker can be easily adjusted over the entire long time delay region in conjunction with a characteristic of a power fuse employed.

SUMMARY OF THE INVENTION

The above and other objects of the invention are realized, using a circuit breaker (1000) comprising:

a current transformer (21) having a primary winding electrically coupled to an AC (alternating current) power supply line (11) and a secondary winding, for detecting a line current ($I_a$) flowing from a power source to a load via said power supply line (11);

a rectifier (30) for rectifying said line current ($I_a$) derived from said secondary winding of the current transformer (21);

a fail current detecting circuit (40;60) for detecting a fail current from said line current ($I_a$) output from said rectifier (30);

a timer circuit (70) connected to said fail current detecting circuit (40;60), for producing a predetermined time delay depending upon magnitude of said fail current, said timer circuit (70) including:

at least a peak value converting circuit (210) for converting said fail current into a corresponding peak value voltage (eZ);

an effective value converting circuit (211) for converting said fail current into a corresponding peak value voltage (eX);

a long-time delay tripping circuit (170) for producing a long-time delay tripping signal in response to one of said peak value voltage (eZ) and effective value voltage (eX);

a switching device (1;201;202;207) for selectively supplying one of said peak value voltage (eZ) and effective value voltage (eX) to said long-time delay tripping circuit (170);

a switching control circuit (2) for controlling said switching device (1;201;202;207) in such a manner that said long-time delay tripping circuit (170) receives said effective value voltage (eX) from said effective value converting circuit (211) through said switching device (1;201;202;207) when said fail current is lower than a predetermined threshold level ($V_{ref}$), whereas said long-time delay tripping circuit (170) receives said peak value voltage (eZ) from said peak value converting circuit (210) through said switching device (1;201;202;207) when said fail current exceeds over said threshold level ($V_{ref}$), and an interrupting device (80;100;120;201) for interrupting supply of said line current ($I_a$) from said power source to said load in response to said long-time delay tripping signal from said long-time delay tripping circuit (170).

According to the circuit breaker of the present invention, until a predetermined current value when the fail current exceeds the rated current, the long time delay tripping operation is accomplished by an output voltage from an effective value converting circuit and, on the other hand, when the fail current further exceeds over the predetermined current value, the long time delay tripping operation is attained by an output voltage from a peak value converting circuit.

As mentioned above, when the fail current flowing through the AC line is set to the predetermined current value exceeding the rated current or more, the effective value of the secondary current induced on the secondary winding of the current transformer is saturated, so that the primary current as the fail current and the secondary current of the current transformer are not proportional to each other.

However, when the fail current is set to a value which is a predetermined number of times as high as the rated current or more, the proportional relationship is substantially held between the primary current as the fail current and the secondary current with respect to the peak value of the current induced on the secondary winding of the current transformer.

Therefore, when the fail current flowing through the AC line is set to the predetermined value exceeding the rated current or more, the long time delay tripping circuit is separated from the effective value converting circuit and made operative by the output voltage from the peak value converting circuit. Thus, the accurate long time delay operating time can be accomplished even if the fail current flowing through the AC line is sufficiently higher than the rated current.

Moreover, since the long time delay tripping operating characteristic curve can be easily adjusted with respect to the characteristic of the power fuse, there is an advantage such that a current transformer of such a small capacity that tends to be easily saturated can be used. In other words, there is a feature such that the breaking characteristic of the circuit breaker can be easily adjusted in conjunction with the characteristic of the power fuse.

BRIEF DESCRIPTION OF THE DRAWINGS

The aforementioned aspects and other features of the invention are explained in the following description, taken in connection with the accompanying drawings, in which.

DETAILED DESCRIPTION OF THE PREFERRED EMBODIMENTS CIRCUIT ARRANGEMENT OF CIRCUIT BREAKER

Figure 6:
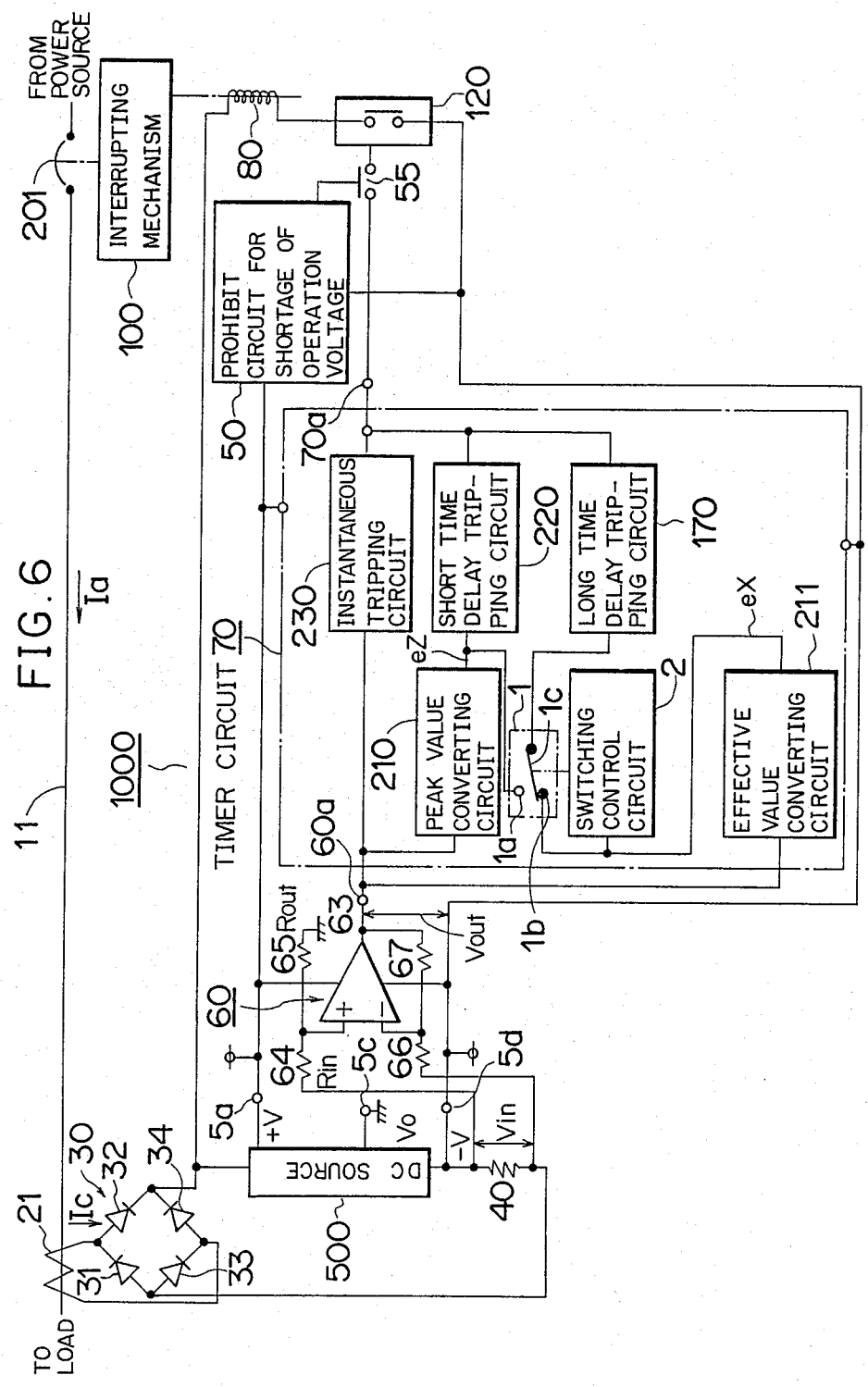
FIG. 6 is a schematic block diagram of a circuit breaker 1000 according to a preferred embodiment of the invention.

FIG. 6 is a circuit diagram showing one preferred embodiment of a circuit breaker 1000 according to the present invention.

A current transformer 21 is inserted into an AC line 11 connected between a power source (not shown) and a load (not shown). A rectifier 30 to rectify a secondary AC output current of the current transformer 21 is connected to the secondary winding of the current transformer 21. The rectifier 30 is of a full-wave type rectifier comprising a series circuit of diodes 31 and 32 and a series circuit of diodes 33 and 34. A DC constant voltage power source circuit 500 is connected to a positive-sided output terminal of the rectifier 30 and has a positive-sided terminal 5a, an intermediate terminal 5c, and a negative-sided terminal 5d.

The negative-sided terminal 5d of the DC power source 500 is connected to one end of a current detecting resistor 40. The other end of the current detecting resistor 40 is connected to the negative-sided terminal 5d of the rectifier 30. A full-wave rectified current corresponding to a load current of the line 11 flows through the resistor 40. A differential amplifier 60 converts a voltage drop of the current detecting resistor 40 into a signal using an intermediate potential $V_0$ of DC power source 500 as a reference potential.

The differential amplifier 60 includes an operational amplifier 63 and four resistors 64 to 67. An electric power is supplied from the DC power source 500 to the differential amplifier 60. An input terminal of the differential amplifier 60 is connected to the current detecting resistor 40.

A timer circuit 70 includes an instantaneous tripping circuit 230, a short-time-delay tripping circuit 220, and a long-time-delay tripping circuit 170. Output terminals of the circuits 230, 220, and 170 are connected in parallel and used as a common output terminal 70a of the timer circuit 70.

That is, the instantaneous tripping circuit 230 is connected to an output terminal 60a of the differential amplifier 60. A series circuit of a peak value converting circuit 210 and the short-time-delay tripping circuit 220 is connected in parallel with the instantaneous tripping circuit 230. On the other hand, an effective value converting circuit 211 is connected to an input terminal of the long-time-delay tripping circuit 170 through a normally-close type contact 1b and a common contact 1c of a switch 1 such as an electromagnetic relay, an output terminal of the peak value converting circuit 210 is connected to a normally-open type contact 1a of the switch 1. The long time delay tripping circuit 170 per se is well known in the art and has already been described in conjunction with FIG. 2; therefore, its description is omitted here.

When the output voltage (i.e., corresponding to the fail current) "eX" from the effective value converting circuit 211 is equal to a predetermined voltage value or more, a switching control circuit 2 of the switch 1 detects this state and switches the common contact 1c of the switch 1 from the normally-close type contact 1b to the normally-open type contact 1a, thereby allowing an output voltage "eZ" of the peak value converting circuit 210 to be input to the long time delay tripping circuit 170.

An electromagnetic tripping coil 80 is connected to a positive-sided output terminal of the rectifier 30. A switch circuit 120 is serially connected to the coil 80. The other end of the switch circuit 120 is connected to the negative-sided terminal 5d of the DC power source 500. The coil 80 is mechanically interlocked with a make and break contact 201 through an interrupting mechanism 100. The contact 201 is inserted into the AC line 11. When the switch circuit 120 is switched from open state to the closed state, the contact 201 is opened.

A prohibit circuit 50 for shortage of operation voltage is connected between the positive-sided terminal 5a and the negative-sided terminal 5d of the DC power source 500. An output switch 55 of the prohibit circuit 50 is provided.

CIRCUIT ARRANGEMENT OF SWITCHING CONTROL CIRCUIT

The foregoing switching control circuit 2 functions as a major circuit in an arrangement of the circuit breaker 1000 according to the invention. Various kinds of circuits may be conceived to embody the switching control circuit 2. For example, a switching control circuit 200 of the analog switch type shown in FIG. 7 will now be described hereinbelow.

Figure 7:
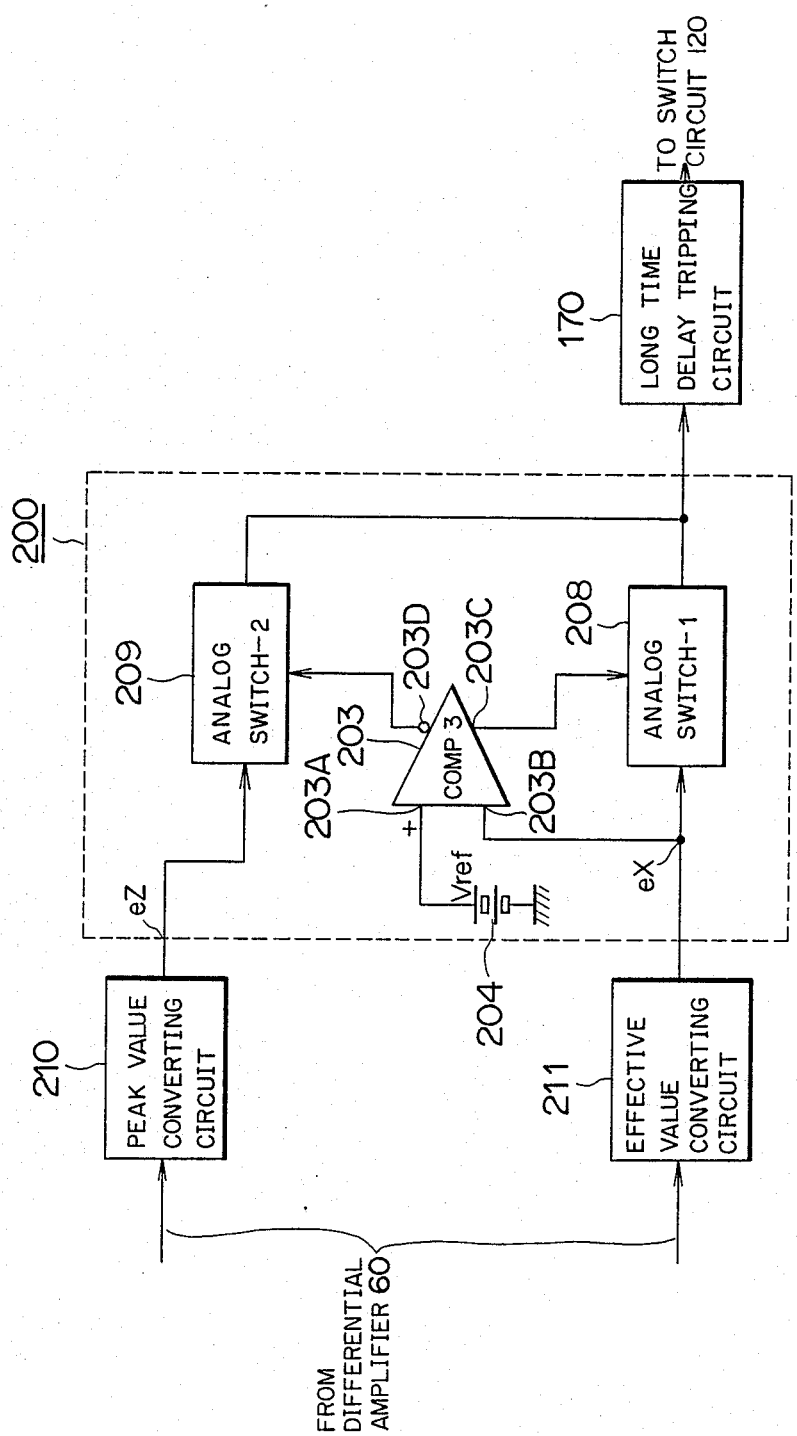
FIG. 7 is a schematic block diagram of a switching control circuit 200 for analog switches corresponding to the switch 1 and switching controlling circuit 2 shown in FIG. 6.

As will be obvious from the circuit diagram of FIG. 7, the switching control circuit 200 includes two analog switches 208 and 209. These analog switches 208 and 209 correspond to the switch 1 in FIG. 6. The first analog switch 208 is connected between the effective value converting circuit 211 and the long time delay tripping circuit 170. The second analog switch 209 is connected between the peak value converting circuit 210 and the long time delay tripping circuit 170. A comparator 203 is provided, one input terminal 203A of which comparator is connected to a positive polarity terminal of a reference power source 204 and the other input terminal 203B is connected to the input side of the first analog switch 208. One output signal of the comparator 203 is output from a first output terminal 203C and used as a switching control signal of the first analog switch 208. On the other hand, the other output signal of the comparator 203 is output from a second output terminal 203D and used as a switching control signal of the second analog switch 209.

The operation of such a switching control circuit 200 will now be described. When the output voltage (corresponding to the fail current) "eX" of the effective value converting circuit 211 is lower than a reference voltage $V_{ref}$ of the reference power source 204, a comparator output signal is supplied to the first analog switch 208 from the first output terminal 203C of the comparator 203. Thus, the first analog switch 208 is turned on, thereby allowing the long time delay tripping circuit 170 to operate on the basis of the effective value "eX" from the effective value converting circuit 211. Subsequently, when the output voltage "eX" increases to a value of the reference voltage $V_{ref}$ or higher, the comparator output signal is supplied to the second analog switch 209 from the second output terminal 203D of the comparator 203. Thus, the long time delay tripping circuit 170 is operable on the basis of the peak value "eZ" from the peak value converting circuit 210. That is, the long time delay tripping circuit 170 is selectively operable based upon either the effective value "eX" or the peak value "eZ" in correspondence to the level of the fail current.

OVERALL OPERATION OF CIRCUIT BREAKER

Referring now to FIGS. 6 and 7, overall operation of the circuit breaker 1000 will be described in detail.

When the primary current $I_a$ flows through the AC line 11, the secondary current $I_c$ determined by the specific current transforming ratio flows through the secondary winding of the current transformer 21. The secondary current $I_c$ is full-wave rectified by the rectifier 30. An output current of the rectifier 30 is returned to the rectifier 30 through the DC power source 500 and current detecting resistor 40. At this time, the full-wave rectified current corresponding to the primary current $I_a$ of the AC line 11 flows through the DC power source 500 and current detecting resistor 40.

When the full-wave rectified current flows through the DC power source 500, voltages $(+V)$ and $(-V)$ which are determined by a potential $V_0$ at the intermediate terminal 5c as a reference voltage, are developed at the output terminals 5a, 5c, and 5d of the DC power source 500.

On the other hand, an electric power for the differential amplifier 60 is supplied from the DC power source 500. An input signal to the differential amplifier 60 is supplied from the current detecting resistor 40. A gain "A" of the differential amplifier 60 can be obtained by the following equation.

$$\text{Gain ``A''} = \frac{V_{out}}{V_{in}} = \frac{R_{out}}{R_{in}}$$

Where, $V_{in}$ and $V_{out}$ denote input and output voltages of the differential amplifier 60, and $R_{in}$ and $R_{out}$ indicate input and output impedances, respectively.

Figure 1:
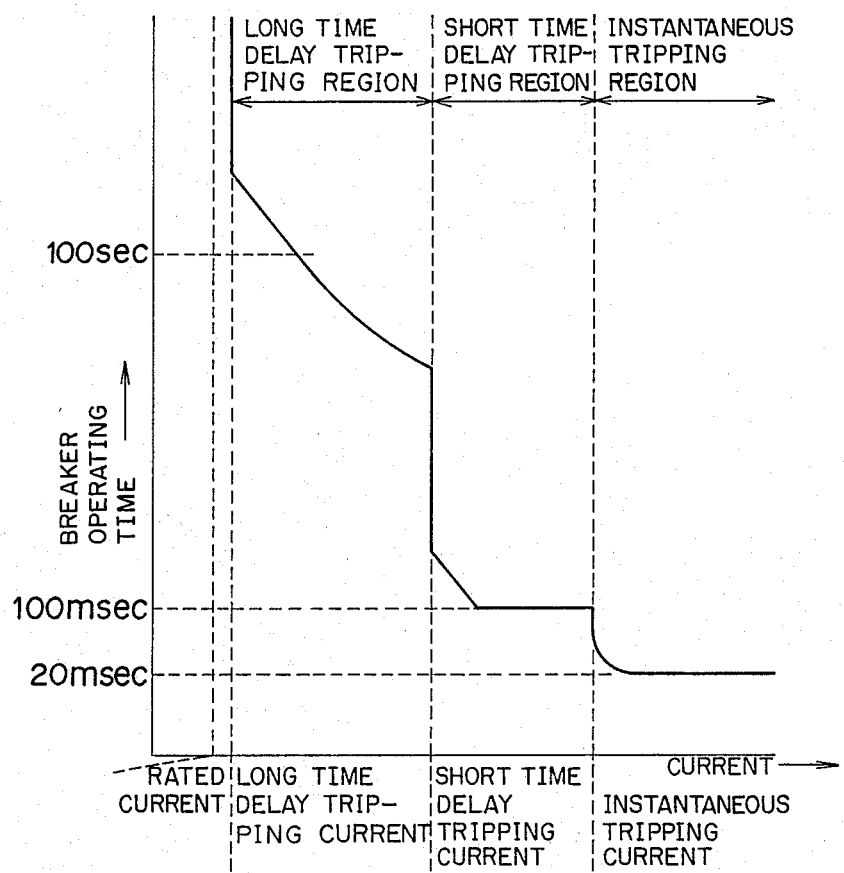
FIG. 1 is a graphic representation for illustrating a relationship between the breaker operating time and the tripping current.

The output of the differential amplifier 60 is applied to the relative instantaneous tripping circuit 230, short time delay tripping circuit 220, and long time delay tripping circuit 170 of the timer circuit 70. These tripping circuits produce output signals so as to accomplish the respective characteristic operations for instantaneous tripping, short time delay tripping, and long time delay tripping as shown in FIG. 1.

LONG TIME DELAY TRIPPING CHARACTERISTIC

Figure 2:
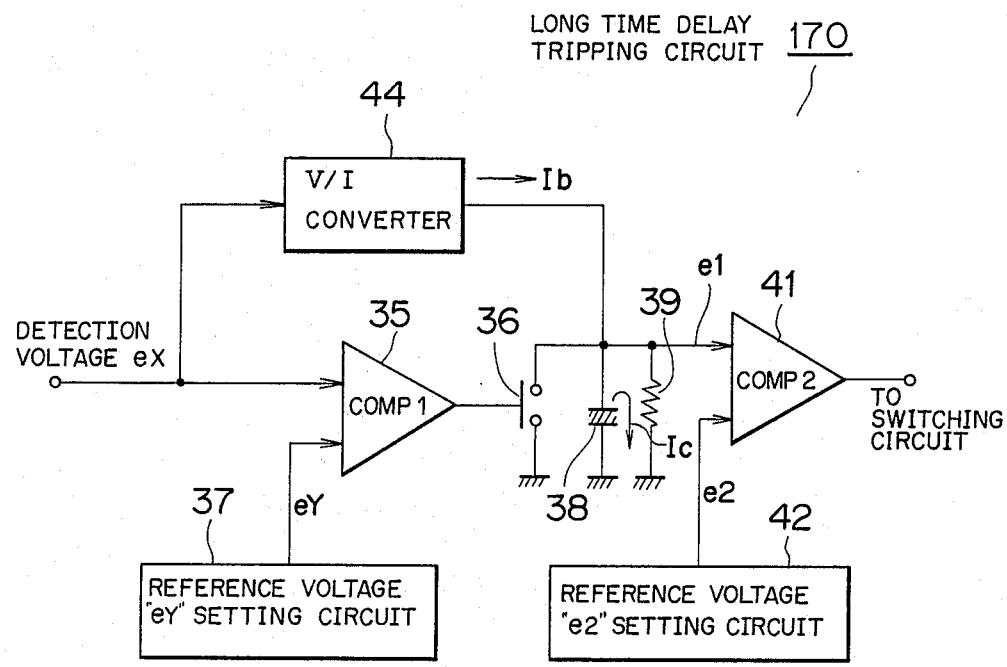
FIG. 2 is a block diagram of the conventional long time delay tripping circuit.
Figure 3:
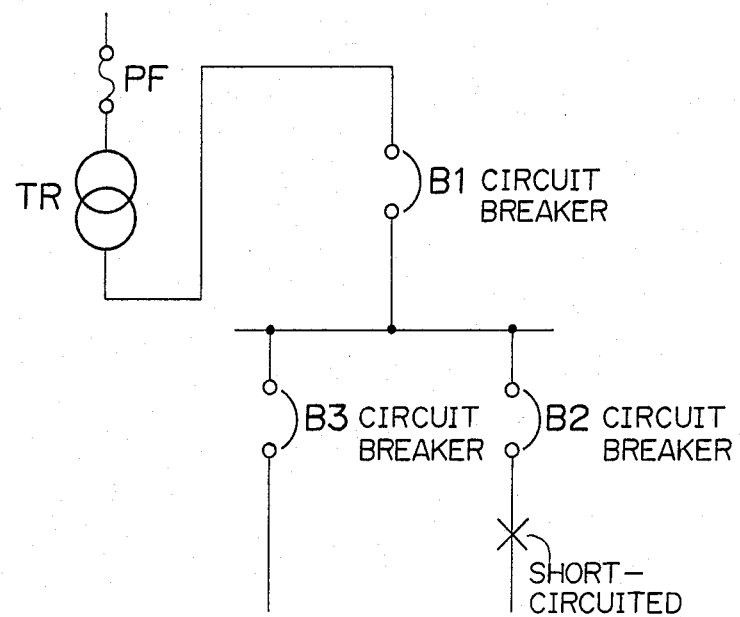
FIG. 3 illustrates a power supplying line system employing the circuit breakers and power fuse.

The long time delay tripping characteristic operation in this embodiment will now be described. The output voltage eX from the effective value converting circuit 211 in the timer circuit 70 is input to the long time delay tripping circuit 170 through the normally-close type contact 1b and common contact 1c of the switch 1. A predetermined long time delay operation which has already been described in conjunction with FIG. 2 is executed. This operation is such a long time delay tripping operation that the fail current is further larger than the rated current of the circuit breaker 1000 and is equal to a current just before a predetermined current value. In this embodiment, this predetermined current value is selected to the value which is five times as high as the rated current value.

The switching control circuit 2 of the switch 1 is adjusted in a manner such that when the output voltage eX of the effective value converting circuit 211 reaches the current value which is five times as large as the rated current value, this state is detected by, e.g., the comparator 203 in FIG. 7 and the common contact 1c of the switch 1 is switched from the normally-close type contact 1b to the normally-open type contact 1a. In other words, the output signal is supplied from the second output terminal 203D of the comparator 203 in FIG. 7 to the second analog switch 209 and the switch 209 is turned on.

Thus, when the fail current is present within a range where it is 2 to 5 times as large as the rated current, the long time delay tripping operation is executed by the output voltage eX of the effective value converting circuit 211. In addition, when the fail current falls within a long time delay tripping range where it is 5 to 10 times as large as the rated current, the long time delay tripping operation is accomplished by the output voltage eZ of the peak value converting circuit 210.

Figure 5:
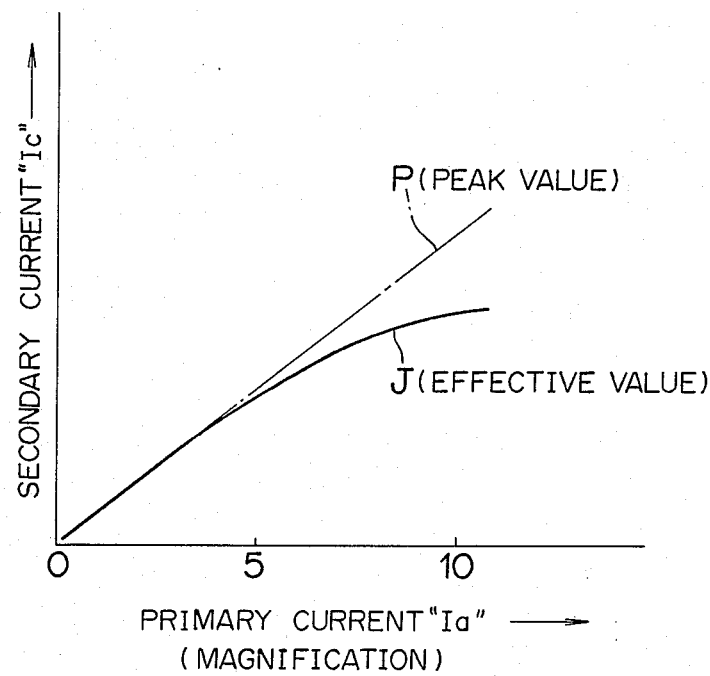
FIG. 5 is a graphic representation for illustrating a relationship between primary and secondary currents of a currents transformer.

When the fail current flowing through the AC line 11 falls within a range where it is 5 to 10 times as large as the rated current, the effective value of the current induced on the secondary winding of the current transformer 21 is saturated as shown in the characteristic curve "J" in FIG. 5, so that the primary current $I_a$ as the fail current and the secondary current $I_c$ are not proportional with each other.

However, when the fail current is present within a range where it is 5 to 10 times as high as the rated current, the proportional relationship between the primary current $I_a$ as the fail current and the secondary current $I_c$ is substantially held as shown by a characteristic curve "P" in FIG. 5 with respect to the peak value of the current induced on the secondary winding of the current transformer 21.

The present invention is made by paying an attention to the saturation characteristic of the foregoing current transformer 21 and is characterized by enabling the long time delay tripping circuit 170 to accurately operate over the whole long time delay tripping region.

In other words, there is a fact such that in the long time delay tripping region, the tripping operation in which the effective value is detected is less influenced by the distortion waveform of the primary current $I_a$, as compared with the tripping operation in which the peak value is detected. However, since the inherent saturation characteristic of the current transformer 21 mentioned above is present, when the fail current increases to a value of a predetermined value (e.g., which is five times as high as the rated current) or more, the proportional relationship between the primary current and secondary current is lost. Therefore, by using the peak value, this proportional relationship can be maintained in the overall long time delay tripping region. Thus, there is a feature such that the long time delay tripping circuit 170 can be accurately operated over the overall long time delay tripping region by selectively using the peak value and effective value of the fail current in accordance with the level of the fail current.

It should be noted that although the adverse influence caused by the distortion of the primary current $I_a$, i.e., the distortion currents by the load appliances is indeed present under the condition that the primary current is equal to the rated current of the circuit breaker, there is practically no adverse influence if the fail current is increased 5 times higher than the rated current. This is because such a higher fail current has a sinusoidal waveform.

In the above embodiment, when the fail current flowing through the AC line 11 is within a range where it is 5 to 10 times as large as the rated current, by allowing the long time delay tripping operation to be executed by the output voltage eZ of the peak value converting circuit 210, even if the fail current flowing through the AC line 11 increases to a sufficiently larger value than the rated current, the accurate long time delay operating time can be accomplished.

The output signal of the timer circuit 70 is transmitted through an output switch 55 of the prohibit circuit 50 and triggers the input of the switch circuit 120 and switches the switch circuit 120 from the open state to the closed state, thereby energizing the electromagnetic tripping coil 80. The coil 80 switches the make and break contact 201 from the closed state to the open state, thereby interrupting the fail current from the start of the overcurrent for, e.g., 100 seconds.

When the current flowing through the contact 201 is so small to be about 10 to 20% as low as the rated current, the output voltage of the DC power source 500 is insufficient for the operation of the timer circuit 70. To prevent that the timer circuit 70 generates an erroneous output in this state, the output switch 55 of the prohibit circuit 50 is opened, thereby preventing that the switch circuit 120 is mistakenly closed.

Figure 4:
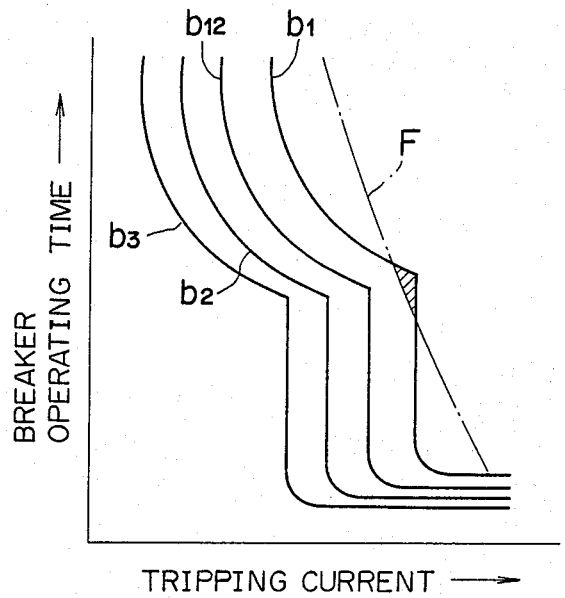
FIG. 4 is a graphic representation for illustrating a relationship between the breaker operating time and tripping current of the conventional circuit breakers.
Figure 8:
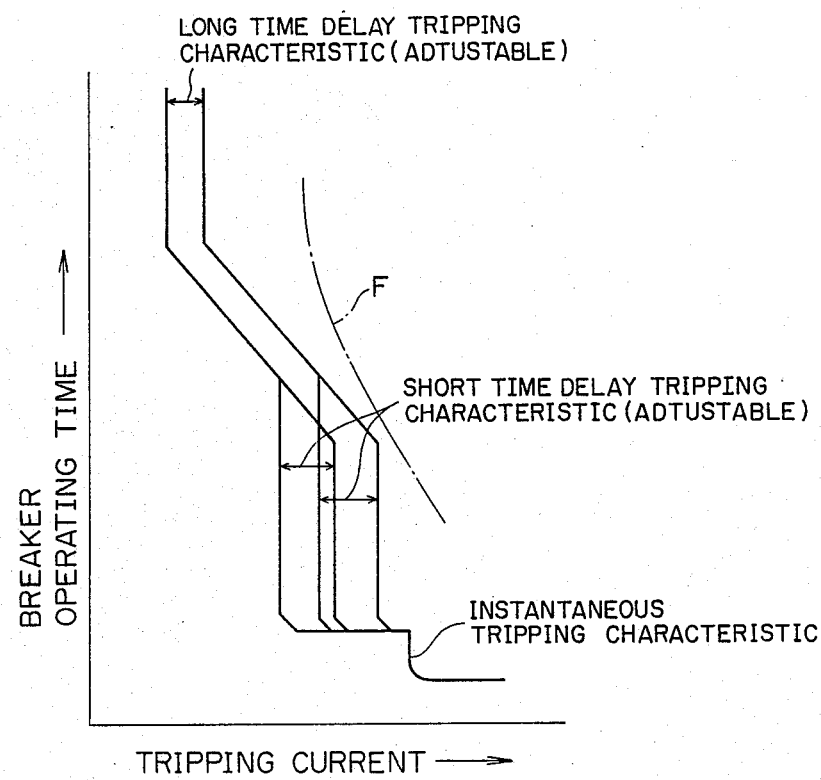
FIG. 8 is a graphic representation for explaining the adjustable range of the long time delay tripping characteristic.

On the other hand, according to the circuit breaker 1000 of the invention mentioned above, tripping characteristics as shown in FIG. 8 are obtained. When the long time delay tripping characteristic is compared with that in the conventional example of FIG. 4, it will be obviously understood that the adjusting capability of the present invention is superior to the conventional one.

MODIFICATIONS

The circuit breaker of the invention is not limited to only the foregoing embodiment but may also be obviously modified.

Figure 9:
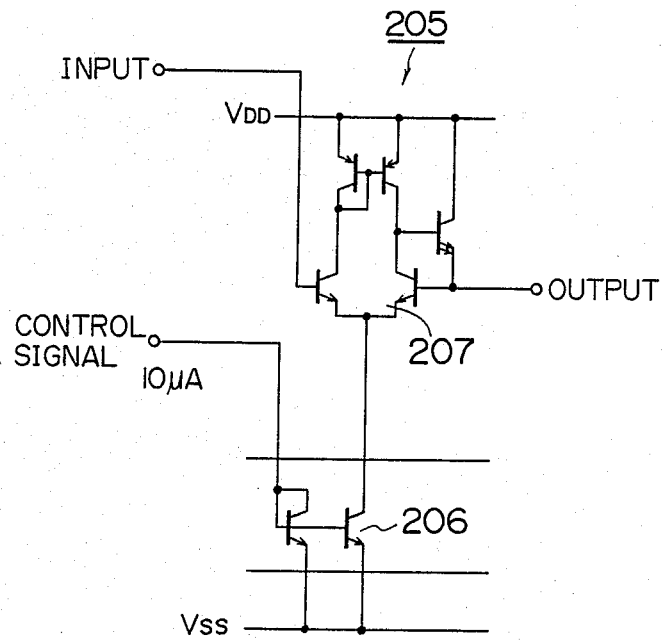
FIG. 9 is a circuit diagram of the transistor type switches.

For example, a transistor type switch 205 as shown in FIG. 9 can be used in place of the analog switches 208 and 209 of the switching control circuit 200 (FIG. 7). Since this transistor type switch circuit itself is also well known, its detailed description is omitted.

In FIG. 9, when a control signal is received from the switching control circuit 200, a transistor 206 is turned on and a main switching transistor 207 connected serially therewith is also turned on, so that the circuit between the input and the output is made conductive.

Further, the above embodiments have been described with respect to a circuit breaker for breaking the single-phase AC line 11. However, the invention may be also applied to a circuit breaker for breaking an AC line of multiphases.

As described above, according to the invention, when the fail current flowing through the AC line is equal to a predetermined current value of the rated current or more, by allowing the long time delay tripping operation to be executed by the peak value of the peak value converting circuit, even if the fail current flowing through the AC line is sufficiently higher than the rated current, the accurate long time delay tripping operation can be accomplished.

What is claimed is:

1. A circuit breaker comprising:
   current transformer means having a primary winding electrically coupled to an AC (alternating current) power supply line and a secondary winding, for detecting a line current flowing from a power source to a load via said power supply line;
   rectifier means for rectifying said line current derived from said secondary winding of the current transformer means;
   fail current means for detecting a fail current from the rectified line current output from said rectifier means;
   timer means connected to said fail current detecting means, for producing a predetermined time delay depending upon the magnitude of said fail current, said timer means including:
   at least a peak value converting circuit for converting said fail current into a corresponding peak value voltage;

an effective value converting circuit for converting said fail current into a corresponding peak value voltage;

a long-time delay tripping circuit for producing a long-time delay tripping signal in response to one of said peak value voltage and effective value voltage;

switching means for selectively supplying one of said peak value voltage and effective value voltage to said long-time delay tripping circuit, and switching control means for controlling said switching means in such a manner that said long-time delay tripping circuit receives said effective value voltage from said effective value converting circuit through said switching means when said fail current is lower than a predetermined threshold level, whereas said long-time delay tripping circuit receives said peak value voltage from said peak value converting circuit through said switching means when said fail current exceeds over said threshold level, and;

interrupting means for interrupting supply of said line current from said power source to said load in response to said long-time delay tripping signal from said long-time delay tripping circuit.

2. A circuit breaker as claimed in claim 1, wherein said fail current detecting means includes:

a resistor through which said rectified line current flows from said rectifier means to develop a voltage; and, an operational amplifier for amplifying said voltage developed across said resistor to derive said fail current.

3. A circuit breaker as claimed in claim 1, wherein said switching means is an electromagnetic relay.

4. A circuit breaker as claimed in claim 1, wherein said switching control means includes a comparator having a first input terminal connected to receive said predetermined threshold level, and a second input terminal connected to receive said effective value voltage, and said switching means is constructed of first and second analog switches, said first and second analog switches being controlled in response to output signals from said comparator.

5. A circuit breaker as claimed in claim 1, wherein said switching control means includes a comparator having a first input terminal connected to receive said predetermined threshold level and a second input terminal connected to receive said effective value voltage, and said switching means is constructed of transistor switches, said transistor switches being controlled in response to output signals from said comparator.

6. A circuit breaker as claimed in claim 1, wherein said timer circuit further comprises:

an instantaneous tripping circuit directly connected to said fail current detecting means; and a short-time-delay tripping circuit connected to said peak value converting circuit.

7. A circuit breaker as claimed in claim 1, wherein said rectifier means is a full-wave rectifier.

8. A circuit breaker as claimed in claim 1, further comprising a prohibit circuit for shortage of operation voltage parallel connected to said interrupting means.

* * * * *